(12) United States Patent
Yoon

(10) Patent No.: US 9,046,443 B2
(45) Date of Patent: Jun. 2, 2015

(54) SYSTEM AND METHOD OF A SIDESLIP TEST FOR VEHICLE

(71) Applicant: Kia Motors Corporation, Seoul (KR)

(72) Inventor: Sang Won Yoon, Seoul (KR)

(73) Assignee: KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/143,530

(22) Filed: Dec. 30, 2013

(65) Prior Publication Data

US 2014/0260582 A1  Sep. 18, 2014

(30) Foreign Application Priority Data

Mar. 15, 2013 (KR) ........................ 10-2013-0027960

(51) Int. Cl.
*E01C 23/00* (2006.01)
*G01M 17/02* (2006.01)

(52) U.S. Cl.
CPC .................................... *G01M 17/02* (2013.01)

(58) Field of Classification Search
USPC .......................................................... 73/146
See application file for complete search history.

(56) References Cited

U.S. PATENT DOCUMENTS

| | | | | |
|---|---|---|---|---|
| 4,786,815 A | * | 11/1988 | Walker et al. | 250/559.38 |
| 5,129,149 A | * | 7/1992 | Colarelli et al. | 33/203.14 |
| 5,386,639 A | * | 2/1995 | Colarelli et al. | 33/203.14 |
| 5,522,144 A | * | 6/1996 | Smoorenburg | 33/203.14 |
| 7,136,736 B2 | * | 11/2006 | Kuragaki et al. | 701/70 |
| 8,061,045 B2 | * | 11/2011 | Grotz | 33/203.12 |
| 2002/0063638 A1 | * | 5/2002 | Gallagher | 340/905 |

FOREIGN PATENT DOCUMENTS

KR  20-0363304 Y1  10/2004

* cited by examiner

*Primary Examiner* — Lisa Caputo
*Assistant Examiner* — Jamel Williams
(74) *Attorney, Agent, or Firm* — Morgan, Lewis & Bockius LLP

(57) ABSTRACT

A sideslip test for a vehicle that can make a database of sideslip and objectively measure the sideslip. A sideslip test system may include: a driving road provided to drive a vehicle; a support beam disposed to be supported on the driving road; a distance sensor mounted on the support beam to measure a distance from the vehicle; and a display device connected with the distance sensor and visualizing a measurement value of the distance sensor. A sideslip test method may include: entering, by the vehicle, the driving road; sensing a distance between the distance sensor and the vehicle; converting data to express the distance sensed by the distance sensor as a coordinate; collecting a closest Y-axis distance between the distance sensor and the vehicle as a representative value; and expressing a distribution of the representative value as a graph through the display device.

6 Claims, 6 Drawing Sheets

SYSTEM AND METHOD OF A SIDESLIP TEST FOR VEHICLE

CROSS-REFERENCE TO RELATED APPLICATION

The present application claims priority of Korean Patent Application Number 10-2013-0027960 filed Mar. 15, 2013, the entire contents of which application is incorporated herein for all purposes by this reference.

BACKGROUND OF INVENTION

1. Field of Invention

The present invention relates to a system and a method of a sideslip test for a vehicle, and more particularly, to a system and a method of a sideslip test for a vehicle that tests lateral incline of a vehicle which is driven by using a laser distance sensor.

2. Description of Related Art

In general, a phenomenon occurs, in which a tire slides laterally due to unbalance of a camber, a kingpin inclination angle, and toe-in of a front wheel while a vehicle is driven. The phenomenon is called sideslip, and a sideslip tester is primary used as a device that measures the degree of sliding of the tire. Herein, the camber means an angle between a vertical line to a road surface and the front wheel, the kingpin means an angle between the center of a shaft and the vehicle line to the road surface, and the toe-in means a state in which a front side of the front wheel is narrower than a rear side of the front wheel.

However, it is difficult to implement an actual driving condition on the sideslip tester and a process of measuring the slideslip may depend on a worker's subject. For example, even though the slideslip of the same vehicle is measured, variations in a measurement result occur when measured by various people. Further, it is not easy for a general sideslip tester to make a database of the slideslip.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a system and a method of a sideslip test for a vehicle having advantages of making a database of sideslip and objectively measuring the sideslip.

Various aspects of the present invention provide for a system of a sideslip test for a vehicle, including: a driving road provided to drive a vehicle; a support beam disposed to be supported on the driving road; a distance sensor mounted on the support beam to measure a distance from the vehicle; and a display device connected with the distance sensor and visualizing a measurement value of the distance sensor.

A condition for the driving road may be set in accordance with an actual driving condition of the vehicle.

The distance sensor may be mounted on the support beam to be disposed at a set height.

The set height may be set for the distance sensor to sense a uniform surface on a lateral surface of the vehicle.

The display device may analyze the measurement value of the laser distance sensor and make a database of the analyzed measurement value to express the measurement value changed with driving of the vehicle through a graph.

Various aspects of the present invention provide for a method of a sideslip test for a vehicle, which uses a system of a sideslip test for a vehicle including a driving road provided to drive a vehicle, a distance sensor measuring a distance from a target, and a display device visualizing a measurement value of the distance sensor, the method including: entering, by the vehicle, the driving road; sensing a distance between the distance sensor and the vehicle; converting data to express the distance sensed by the distance sensor as a coordinate; collecting a closest Y-axis distance between the distance sensor and the vehicle as a representative value; and expressing a distribution of the representative value as a graph through the display device.

The method may further include judging whether the sideslip is passed or failed based on the graphed data.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
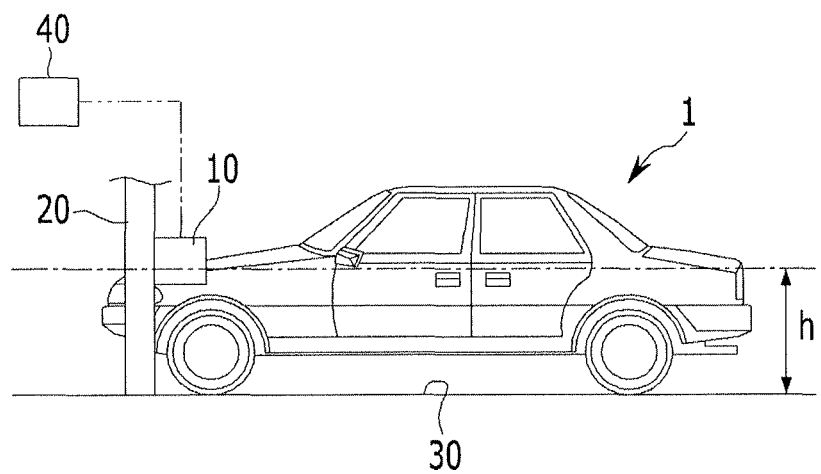
FIG. 1 is a schematic diagram of an exemplary system of a sideslip test for a vehicle according to the present invention.

FIG. 1 is a schematic diagram of a system of a sideslip test for a vehicle according to various embodiments of the present invention.

As illustrated in FIG. 1, a system of a sideslip test for a vehicle according to various embodiments of the present invention performs sideslip test while a vehicle 1 is actually driven, and includes a driving road 30, a laser distance sensor 10, a support beam 20, and a display device 40.

The driving road 30 is a road provided to test sideslip while the vehicle 1 is actually driven. Further, one will appreciate that conditions such as roughness and an inclination of the surface of the driving road 30 may be variously changed and set so as to implement an actual driving condition of the vehicle 1 in accordance with the present invention.

The laser distance sensor 10 is disposed on one side of the driving road 30. Further, the laser distance sensor 10 is a device that measures a distance between the laser distance sensor 10 and an object by using a laser. Since a function of the laser distance sensor 10 is apparent is otherwise conventional, a more detailed description will be omitted. Meanwhile, in the system of a sideslip test for a vehicle according to various embodiments of the present invention, the object is the vehicle 1.

The support beam 20 is a pole on which the laser distance sensor 10 is mounted. Further, the support beam 20 is supported on the driving road 30 and supports the laser distance sensor 10. Furthermore, the laser distance sensor 10 and the support beam 20 are disposed at locations to easily evaluate the sideslip based on a value acquired by measuring a distance between the laser distance sensor 10 and the vehicle 1. That is, the laser distance sensor 10 may measure a lateral motion of the vehicle by a distance from a lateral surface of the vehicle 1.

Meanwhile, the laser distance sensor 10 is mounted on the support beam 20 at a set height h spaced from the driving road 30 by a predetermined distance. Herein, the set height h may be a height of a lateral surface having the highest uniform surface on the lateral surface of the vehicle 1. Therefore, the set height h may be changed depending on a vehicle type and a design in accordance with the present invention.

The display device 40 is a device for visualizing the lateral motion of the vehicle measured by the laser distance sensor 10. Further, the display device 40 is connected with the laser distance sensor 10 and receives a measurement value from the laser distance sensor 10. The display device 40 analyzes the measurement value of the laser distance sensor 10 and makes a database of the measurement value to express the measurement value by a graph and a chart. That is, a computer is incorporated in the display device 40.

Figure 2:
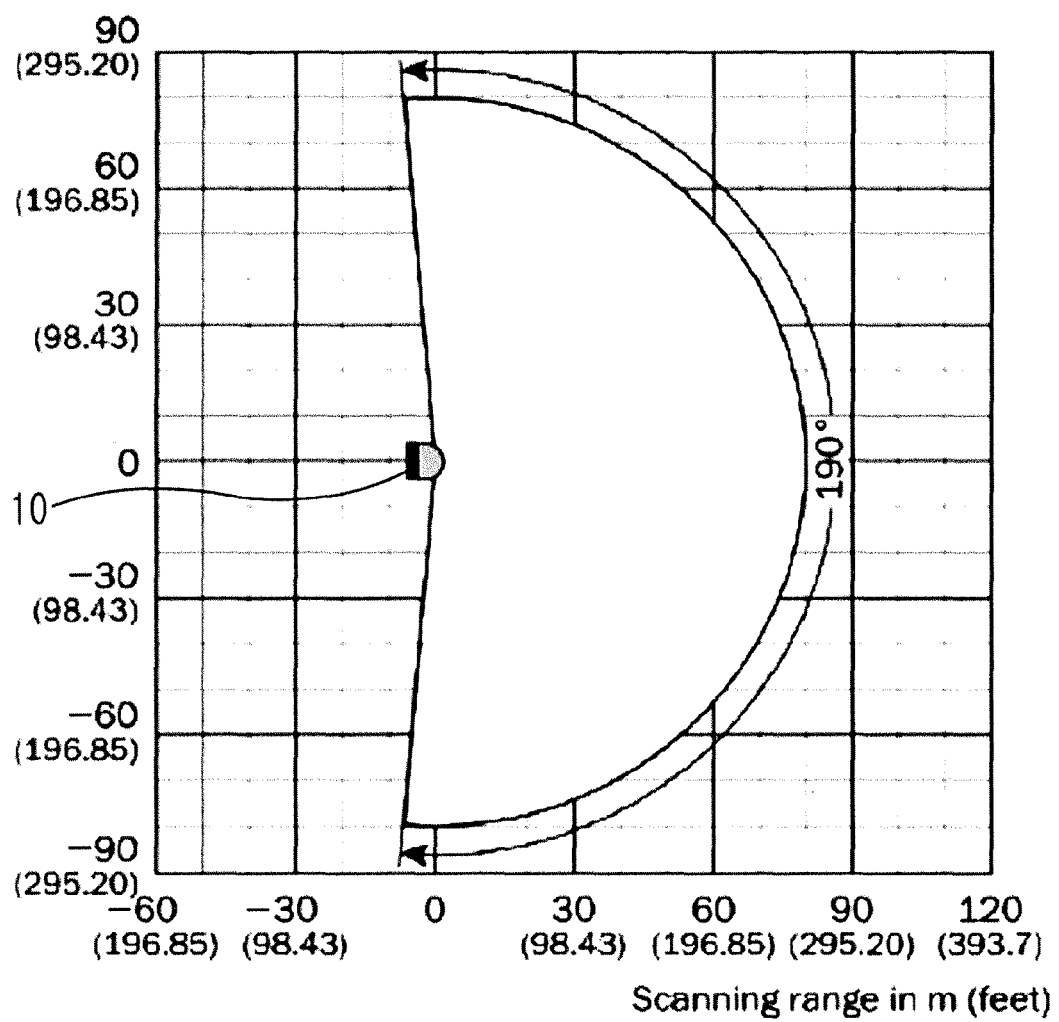
FIG. 2 is a diagram illustrating a sensing range of an exemplary laser distance sensor according to the present invention.

FIG. 2 is a diagram illustrating a sensing range of a laser distance sensor according to various embodiments of the present invention.

As illustrated in FIG. 2, the laser distance sensor 10 may sense a distance as large as a range of a sector shape having a radius of 80 m throughout approximately a sensing angle of 190□. A sensing range of the sector shape by using a coordinate (0, 0) of a horizontal axis and a vertical axis as the location of the laser distance sensor 10 is illustrated in FIG. 2. Further, a distance is expressed by the unit of m on the horizontal axis and the vertical axis. Furthermore, a distance is expressed by the unit of feet in parenthesis. The sensing range and performance of the laser distance sensor 10 are one example, and various laser distance sensors 10 having different sensing ranges and performances may be applied to the system of a sideslip test for a vehicle according to various embodiments of the present invention. Meanwhile, for easy description, a method of measuring a distance of a system of a sideslip test for a vehicle according to various embodiments of the present invention will be described based on the laser distance sensor 10 having the sensing range of the sector shape having the sensing angle 190□ and the radius of 80 m.

Figure 3:
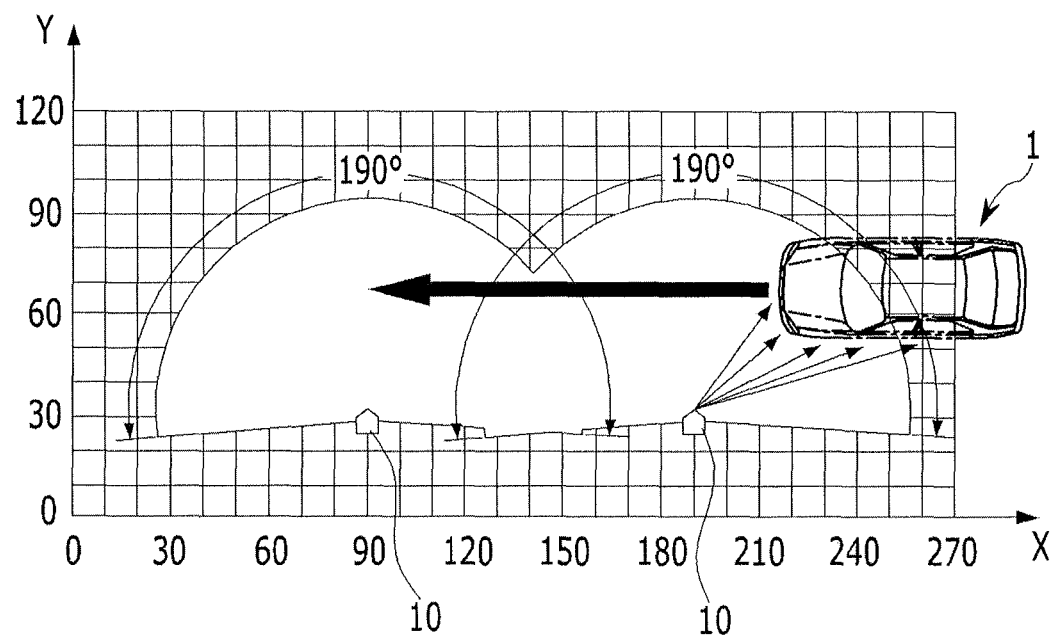
FIG. 3 is a diagram illustrating an exemplary distance measuring method of the system of a sideslip test for a vehicle according to the present invention.

FIG. 3 is a diagram illustrating a distance measuring method of the system of a sideslip test for a vehicle according to various embodiments of the present invention.

As illustrated in FIG. 3, when two or more laser distance sensors 10 are used, the distance between the laser distance sensor 10 and the vehicle 1 may be measured over a driving distance of 200 m or more. Two laser distance sensors 10 are disposed at an interval of 100 m in FIG. 3, but the present invention is not limited thereto. Further, when a distance and an angle between the laser distance sensor 10 and the vehicle 1 are collected by the display device 40 with a motion of the vehicle in a top view, the display device 40 converts data to be expressed by the distance and angle (X, Y) coordinate. Herein, when more laser distance sensors 10 are used within a predetermined distance, the accuracy of the system of a sideslip test for a vehicle according to various embodiments of the present invention may be improved.

Figure 4:
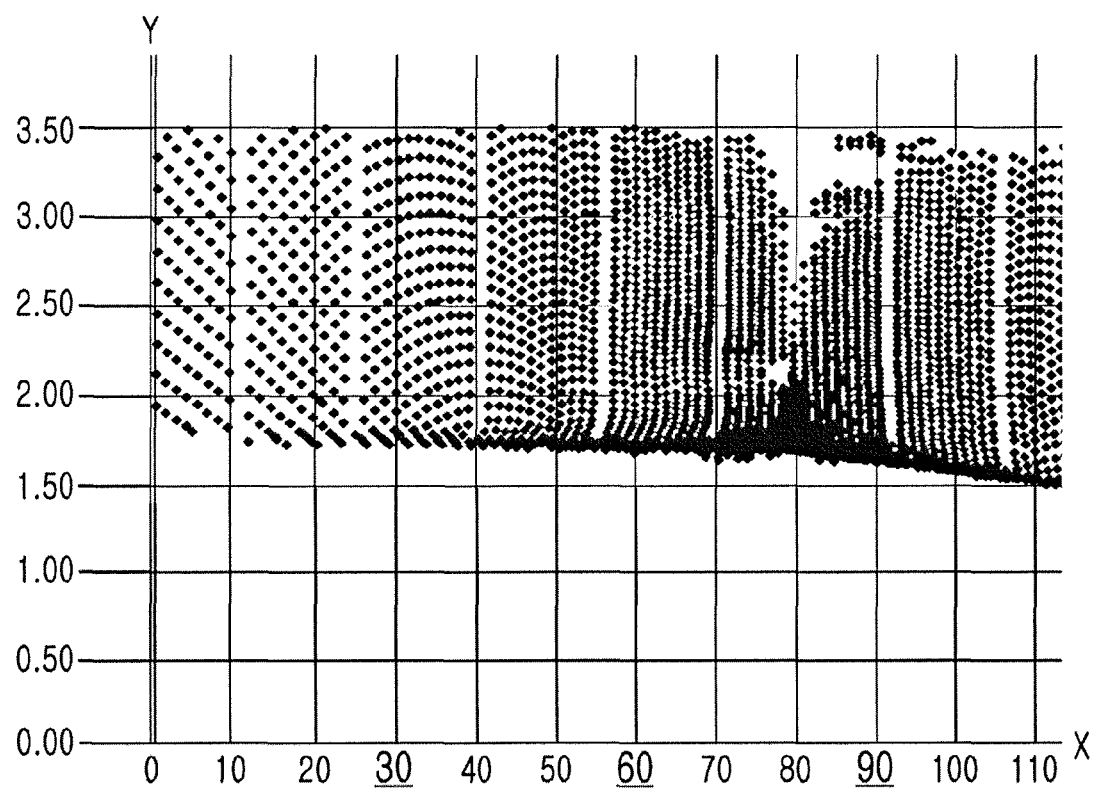
FIG. 4 is a diagram illustrating an exemplary distance measuring result value of the system of a sideslip test for a vehicle according to the present invention.

FIG. 4 is a diagram illustrating a distance measuring result value of the system of a sideslip test for a vehicle according to various embodiments of the present invention.

As illustrated in FIG. 4, the distance between the laser distance sensor 10 and the vehicle 1 which is changed while the vehicle 1 is driven in an arrow direction of FIG. 3 by vibration of the laser that reciprocates between the laser distance sensor 10 and the vehicle 1 may be expressed by a plurality of spots on the (X, Y) coordinate through the display device 40. The distance is expressed by the unit of m on the X axis and the Y axis of FIGS. 3 and 4. Referring to FIGS. 3 and 4, it can be seen that the vehicle 1 starts being driven while being spaced from the laser distance sensor 10 by a predetermined distance.

The display device 40 collects data closest in a Y-axis direction among data expressed by the plurality of spots every predetermined frequency and linearizes a driving trajectory of the vehicle 1 by using the collected data as a representative value.

Figure 5:
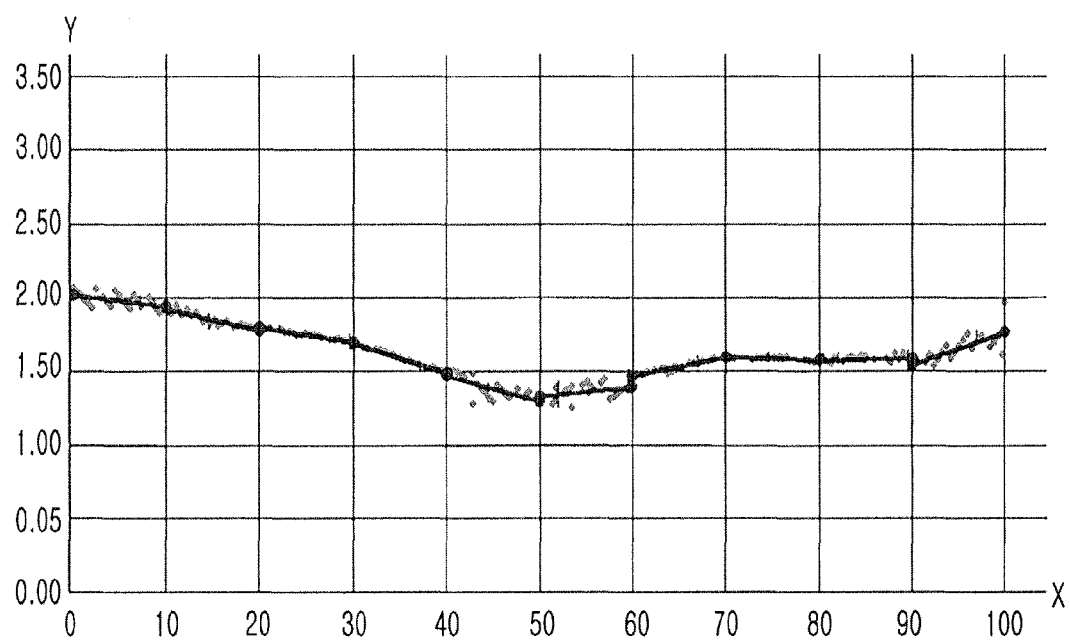
FIG. 5 is a graph deducting an exemplary distance measuring result of the system of a sideslip test for a vehicle according to the present invention.

FIG. 5 is a graph deducting a distance measuring result of the system of a sideslip test for a vehicle according to various embodiments of the present invention.

As illustrated in FIG. 5, the representative value is expressed by a plurality of spots and the driving trajectory of the vehicle 1 is expressed by a straight line. Herein, the straight line expressing the driving trajectory is implemented by linearizing a distribution of the representative value at an interval of 10 m. Further, a driving section of the vehicle 1 is segmented at the interval of 10 m to formulate the driving trajectory of the vehicle 1.

It may be judged whether the sideslip is passed or failed based on the graph deducting the distance measuring result the system of a sideslip test for a vehicle, and the driving trajectory of the vehicle 1 is formulated to apply various logics for judging whether the sideslip is passed or failed.

Figure 6:
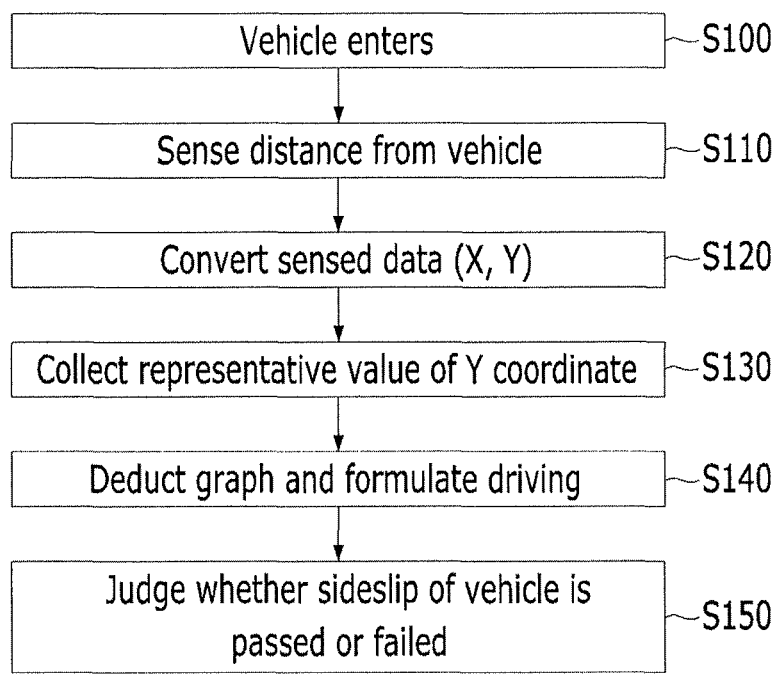
FIG. 6 is an exemplary flowchart of a method of a sideslip test for a vehicle according to the present invention.

FIG. 6 is a flowchart of a method of a sideslip test for a vehicle according to various embodiments of the present invention.

As illustrated in FIG. 6, when the vehicle 1 enters the driving road 30, the laser distance sensor 10 senses the distance between the laser distance sensor 10 and the vehicle 1 (S110).

When the data associated with the distance and angle of the vehicle 1 sensed by the laser distance sensor 10 is transferred to the display device 40, the display device 40 converts the data so as to display the transferred data on the (X, Y) coordinate in the top view of the vehicle 1 (S120).

When the data is expressed by a plurality of spots on the (X, Y) coordinate (S120), the display device 40 collects data closest in a Y-axis direction among the plurality of spots as a representative value (S130). Further, the display device 40 deducts the distribution of the representative value through the graph and formulates driving of the vehicle 1 (S140).

It is judged whether sideslip is passed or failed based on the graph and the formulated data (S150). Herein, a reference for judging whether the sideslip is passed or failed may be input by the display device 40 in advance.

As described, above, according to various embodiments of the present invention, the sideslip is made to a database and is formulated to be expressed through the graph and visualized. Therefore, the sideslip may be objectively judged. Further, various logics for judging whether the sideslip is passed or failed may be applied.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system of a sideslip test for a vehicle, comprising:
a driving road provided to drive a vehicle;
a support beam disposed to be supported on the driving road;
a distance sensor mounted on the support beam to measure a distance from the vehicle; and
a display device connected with the distance sensor and visualizing a measurement value of the distance sensor, wherein the display device analyzes the measurement value of the distance sensor and makes a database of the analyzed measurement value to express, through a graph, the measurement value changed with driving of the vehicle.

2. The system of claim 1, wherein:
a condition for the driving road is set in accordance with an actual driving condition of the vehicle.

3. The system of claim 1, wherein:
the distance sensor is mounted on the support beam disposed at a set height.

4. The system of claim 3, wherein:
the set height is set for the distance sensor to sense a uniform surface on a lateral surface of the vehicle.

5. A method of a sideslip test for a vehicle comprising:
using a system of a sideslip test for a vehicle including a driving road provided to drive a vehicle, a distance sensor to measure a distance from a target, and a display device visualizing a measurement value of the distance sensor;
entering, by the vehicle, the driving road;
sensing a distance between the distance sensor and the vehicle;
converting data to express the distance sensed by the distance sensor as a coordinate;
collecting a closest Y-axis distance between the distance sensor and the vehicle as a representative value; and
expressing a distribution of the representative value as a graph through the display device.

6. The method of claim 5, further comprising:
judging whether the sideslip is passed or failed based on the graphed data.

* * * * *